United States Patent
Heuser et al.

(10) Patent No.: US 7,586,265 B2
(45) Date of Patent: Sep. 8, 2009

(54) ILLUMINATION DEVICE

(75) Inventors: Karsten Heuser, Erlangen (DE); Arvid Hunze, Erlangen (DE); Ralph Paetzold, Roth (DE)

(73) Assignee: Osram Opto Semiconductors GmbH, Regensburg (DE)

( * ) Notice: Subject to any disclaimer, the term of this patent is extended or adjusted under 35 U.S.C. 154(b) by 181 days.

(21) Appl. No.: 11/677,269

(22) Filed: Feb. 21, 2007

(65) Prior Publication Data
US 2007/0194719 A1 Aug. 23, 2007

(30) Foreign Application Priority Data
Feb. 21, 2006 (DE) .................. 10 2006 008 018

(51) Int. Cl.
*G09G 3/10* (2006.01)
(52) U.S. Cl. ............... 315/169.3; 315/224; 315/209 R; 315/291; 315/307
(58) Field of Classification Search ............. 315/169.3, 315/169.4, 209 R, 224, 225, 291, 307
See application file for complete search history.

(56) References Cited

U.S. PATENT DOCUMENTS

| 7,050,024 | B2 * | 5/2006 | LeChevalier | ............ 345/84 |
| 7,375,473 | B2 * | 5/2008 | Cok | ............ 315/308 |
| 7,423,617 | B2 * | 9/2008 | Giraldo et al. | ............ 345/82 |
| 2002/0180721 | A1 | 12/2002 | Kimura et al. | |
| 2003/0071821 | A1 | 4/2003 | Sundahl et al. | |
| 2005/0110420 | A1 | 5/2005 | Arnold et al. | |

FOREIGN PATENT DOCUMENTS

| DE | 10 2004 022 424 A1 | 12/2005 |
| DE | 10 2004 057 379 B3 | 8/2006 |
| EP | 1 091 339 A | 4/2001 |
| WO | WO 2005/109389 A1 | 11/2005 |

OTHER PUBLICATIONS

European Search Report, European Application Serial No. EP 07 00 2937, May 29, 2007, 6 pp.

* cited by examiner

*Primary Examiner*—Tuyet Vo
(74) *Attorney, Agent, or Firm*—Fish & Richardson P.C.

(57) ABSTRACT

An illumination device is described that includes a light source that is an organic light-emitting diode and a control device capable of adjusting the current through the organic light-emitting diode, which increases current as the electric resistance of the organic light-emitting diode increases.

18 Claims, 2 Drawing Sheets

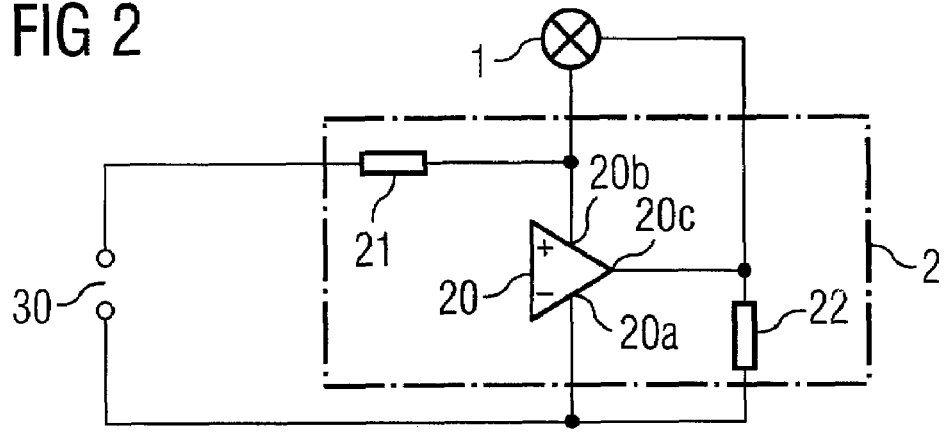
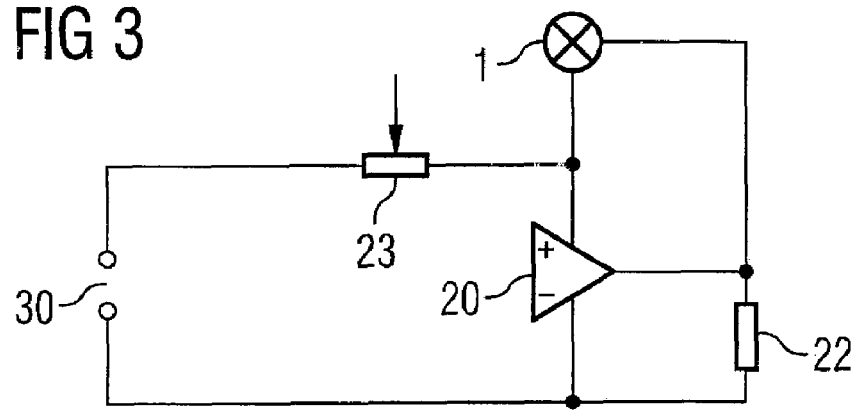
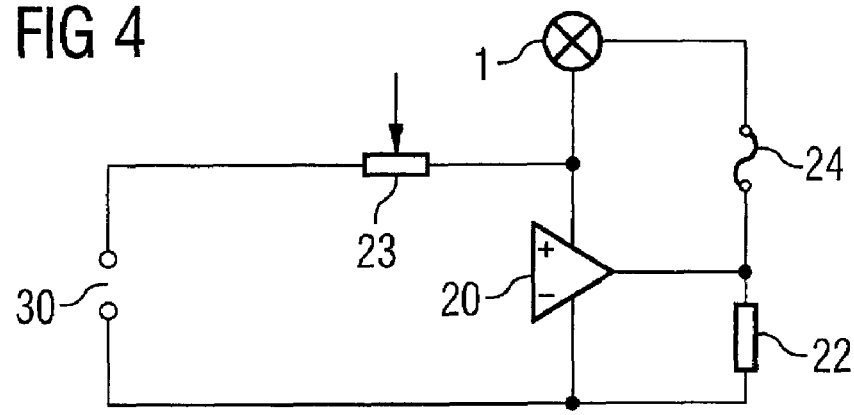

ILLUMINATION DEVICE

BACKGROUND

This application is directed to illumination devices.

SUMMARY

Organic light-emitting diode (OLED) devices can be used for a number of lighting purposes. One potential drawback of OLED devices is that their illumination quality can change over device lifetime.

According to at least one embodiment of an illumination device described herein, the illumination device includes a light source, which includes an OLED. The organic light-emitting diode includes, for example, at least one active layer of an organic material suitable to generate radiation. The active layer may contain a polymer or a small molecule material. The organic light-emitting diode may be the only light source of the illuminating device.

According to at least one embodiment of an illumination device described herein, the illumination device includes a control device in addition to a light source. The control device is capable of regulating the current that flows through the organic light-emitting diode. The control device may be capable of regulating the current through the organic light-emitting diode as a function of the organic light-emitting diode's resistance. For example, as the electric resistance of the organic light-emitting diode increases, the control device will increase the amount of current that flows through the organic light-emitting diode.

According to at least one embodiment of an illumination device described herein, the illumination device includes a light source that includes an organic light-emitting diode. The illumination device further includes a control device capable of regulating the current through the organic light-emitting diode as a function of the electric resistance of the organic light-emitting diode.

BRIEF DESCRIPTION OF THE DRAWINGS

The illumination device described herein will be explained in greater detail using their embodiments and associated figures.

FIG. 2 shows a circuit diagram of one described illumination device according to a second embodiment.

FIG. 3 shows a circuit diagram of a described illumination device according to a third embodiment.

FIG. 4 shows a circuit diagram of a described illumination device according to a fourth embodiment.

Figure 1:
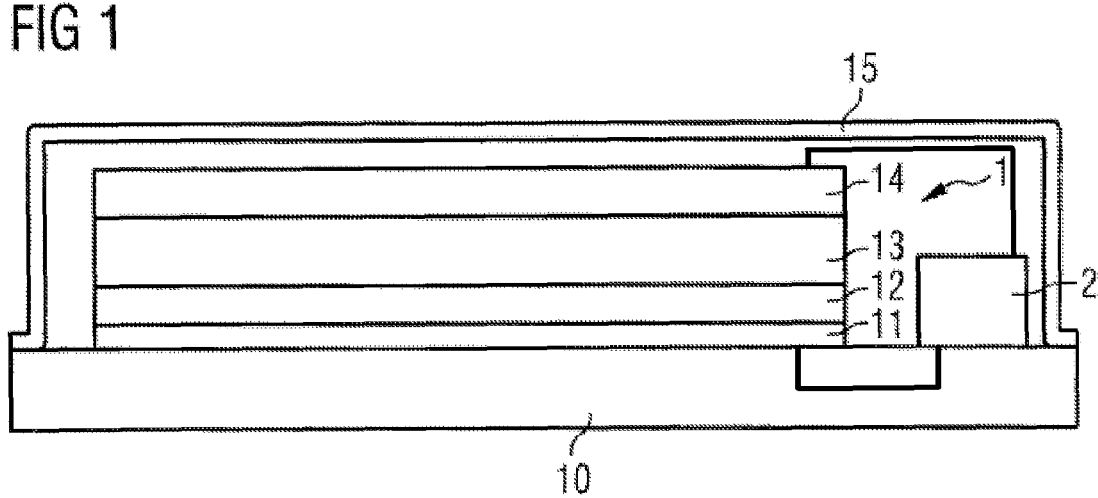
FIG. 1 shows a schematic cross-sectional view of the described illumination device according to a first embodiment.

In the embodiments and figures, equal or equally functioning components are referenced with the same indicators. The depicted elements are not true to scale, instead, the size of individual elements may be exaggerated for better understanding.

DETAILED DESCRIPTION

In organic light-emitting diodes, the intensity of the emitted electromagnetic radiation decreases as operating time increases. This decrease of the intensity and/or brightness can be a function of the operating time. The decrease of the intensity and/or brightness can limit the applications for which an organic light-emitting diode is suitable, for example, when the organic light-emitting diode is used in an illumination device.

It has been shown that as the operating time of the organic light-emitting diode increases, the voltage drop across the organic light-emitting diode also increases. This increased voltage drop occurs due to the increase of the electric resistance of the organic light-emitting diode as operating time increases.

The illumination device described in this application uses, among other things, the idea that the electrical resistance of the organic light-emitting diode can be used as a passive component in a control device.

The control device can be used to control the current passing through the light-emitting diode, for example, in such a manner that the current increases as the electrical resistance of the organic light-emitting diode increases. In this manner, the control device is able to regulate the current passing through the organic light-emitting diode, thus enabling the organic light-emitting diode to emit electromagnetic radiation with a constant or nearly constant intensity and/or brightness over the lifetime of the organic light-emitting diode.

According to at least one embodiment of the illumination device, the control device includes at least one operational amplifier (op-amp). An operational amplifier is an electric component exhibiting one inverting input, one non-inverting input and one output.

According to at least one embodiment of the illumination device, the control device also includes at least one electric resistor. Selecting the electric resistance of the electric resistor allows dimensioning of the circuit such that the current—respectively the increase of current—can be adjusted at a desirable rate as the resistance of the organic light-emitting diode increases.

According to at least one embodiment of the illumination device, the control device includes at least one potentiometer or other variable resistance element. In addition to the potentiometer, the illumination device may include another component that allows for the continuous or incremental adjustment of the resistance of the control device. This type of adjustable resistance—preferably adjustable from outside the illumination device—allows especially accurate control of the intensity and/or brightness of the electromagnetic radiation emitted by the organic light-emitting diode.

According to at least one embodiment of the illumination device, the control device further includes at least one electric fuse. The electric fuse may be installed inside the control device to prevent damage to the components if the amperage gets too high. If the organic light-emitting diode fails and causes surge in current, the control device will be protected from damage by the electric fuse. This allows the defective organic light-emitting diode to be replaced with a new operational organic light-emitting diode. The fuse can be replaced and new organic light-emitting diode can be operated with the same control device.

According to at least one embodiment of the illumination device, the light source and the control device are installed on a joint carrier. This carrier may be connector carrier for the components of the control device. The carrier has contact points and circuit paths for the electric hook-up and connecting to the components of the control device as well as the light source. The joint carrier for the light source and the control device may also be a carrier substrate for the organic light-emitting diode. In this case, the layers of the organic light-emitting diode, such as electrode layers and active organic layers as well as the control device are arranged on the carrier substrate.

According to at least one embodiment of the illumination device, at least one component of the control device includes of organic material. This component may be a resistor, an op-amp, a transistor, a rectifier and/or contact points and circuit paths. The component may contain or be made entirely of the organic material. The component may exhibit an electrically conductive layer as well as functional organic layers. It is also possible that contact points or circuit paths of the control device contain an organic material, such as PEDOT, or are made entirely out of this material.

According to at least one embodiment of the illumination device, the light source, including the organic light-emitting diode, and the control device are jointly encapsulated. This joint encapsulation, which can be in the form of a cap, for example, seals the light source and the control device from the surrounding environment. In some implementations, the encapsulation provides a hermetic seal around the light source. This is especially advantageous if the components of the control device contain an organic material since the hermetic seal increases the life of such environmentally sensitive components.

FIG. 1 shows the illumination device described herein according to a first embodiment. The illumination device includes an organic light-emitting diode 1, which is the light source of the illumination device. The illumination device further includes a control device 2. The organic light-emitting diode 1 includes, for example, a first electrode layer 11, which may function as the anode of the organic light-emitting diode. The electrode layer 11 may contain a metal such as platinum, gold, palladium, or indium, a metal oxide such as tin oxide, zinc oxide, or indium tin oxide or a doped semiconductor material. On the first electrode 11 is arranged, for example, a hole injection layer 12, which may be made of a polymer or of a small molecule material. The hole injection layer 12 may, for example, contain or be made entirely of PEDOT:PSS.

Arranged on the hole injection layer 12 is an active layer 13 capable of generating radiation. The active layer 13 contains an organic material. The active layer 13 may, for example, contain a polymer material or a small molecule material. This active layer 13 can, in some embodiments, generate white light.

The active layer 13 is followed by a second electrode layer 14. The second electrode layer 14 may, for example, be a cathode of the organic light-emitting diode. The second electrode layer 14 may contain or be made of one or more of the following materials: aluminum, indium, silver, gold, magnesium, calcium, or barium. The organic light emitting diode can also include other layers of material, such as hole injection, electron injection, buffer or other layers.

As shown in FIG. 1, the first electrode layer 11 of the organic light-emitting diode is attached to a carrier 10. However, the organic light-emitting diode may also be attached to the carrier 10 by its second electrode layer 14. The carrier 10 may contain one of the following materials: glass, plastic, or metal.

Installed on the carrier 10 in addition to the organic light-emitting diode may be the control device 2 or components of the control device 2. This may prove to be advantageous if components of the control device as described above are made of organic materials or contain organic materials. In this case, the layers of the organic light-emitting diode can be simultaneously manufactured together with the components of the control device on the carrier 10.

The organic light-emitting diode 1 and the control device 2 may be jointly encapsulated by a cap 15. The cap 15 contains or is made of one or more of the following materials, for example: glass, plastic, or metal. The cap 15 can encapsulate the organic light-emitting diode 1 and the control device 2, including components of the control device 2, hermetically. Thus, outside air and/or humidity may be prevented from entering the illumination device.

FIG. 2 shows an illumination device as described herein according to a second embodiment. FIG. 2 shows a schematic circuit diagram for a second embodiment of the described illumination device. The illumination device consists of an organic light-emitting diode 1 and a control device 2. In the second embodiment, the control device 2 includes an operational amplifier 20 with one inverting input 20a, one non-inverting input 20b, and one output 20c. The control device 2 further includes one first resistor 21 with the electric resistance R1.

The organic light-emitting diode 1 exhibits a second resistance R2. The second resistance R2 changes with the operating time of the organic light-emitting diode. As stated above, the resistance R2 of the organic light-emitting diode typically increases with the length of the operating time. The control device 2 further includes a third resistor 22 with an electric resistance R3.

The non-inverting input 20b of the operational amplifier 20 is connected to the first resistor 21 and the organic light-emitting diode 1. The output 20c of the operational amplifier 20 is connected to the organic light-emitting diode 1 and the third electric resistor 22. The inverting input of the operational amplifier is connected to the third resistor 22 and the voltage supply 30.

The current I flowing through the organic light-emitting diode 1 is subject to the following correlation: $I=-U(R2/R1)/R3$ where U is the voltage generated by the voltage source 30.

This means that the current I passing through the organic light-emitting diode is proportional to the resistance R2 of the organic light-emitting diode. In the illumination device described in FIG. 2 the increase in current through the organic light-emitting diode is therefore a function of the electric resistance R2 of the organic light-emitting diode. The increase in current counter-balances the decrease in brightness of the organic light-emitting diode, which occurs as the operating time increases. The described control device allows the illumination device to emit electromagnetic radiation of a very constant intensity and/or brightness over a long period of time. In some embodiments, the organic light-emitting diode can have a lift span of around a few hundred thousand hours, such as 200,000 hours.

The illumination device may be configured as described in FIG. 1, i.e., the organic light-emitting diode 1 and the control device 2 may be encapsulated together.

The components of the control device 2, i.e., the resistors 21, 22 as well as the operational amplifier 20, for example, may also be with the organic light-emitting diode 1 on a joint connection carrier. The joint connection carrier may be a circuit board. This circuit board may be a metal-core plate or a printed circuit board.

In this case, the control device 2 and the organic light-emitting diode are not jointly encapsulated. This makes the replacement of the organic light-emitting diode 1 in the event of a failure of the organic light-emitting diode especially easy.

FIG. 3 shows a schematic circuit diagram of the described illumination device according to a third embodiment. In contrast to the second embodiment described in FIG. 2, the first resistor 21 is replaced by an adjustable resistor 23 in the form of a potentiometer. This allows for the exact adjustment of the current through the organic light-emitting diode and therefore of the intensity and/or brightness of the electromagnetic radiation emitted from the illumination device.

FIG. 4 shows a schematic circuit diagram of the described illumination device according to a fourth embodiment. In addition to the components in the third embodiment and described in connection with FIG. 3, an electric fuse 24 is integrated into the circuit. The electric fuse 24 protects the control device 2 when the current I exceeds a maximum value. This allows the continued use of the control device 2 after a defective organic light-emitting diode 1 has been replaced with a new organic light-emitting diode.

Due to the consistent intensity of the electromagnetic radiation emitted by the illumination device, the illumination device is especially suited for a variety of applications. The illumination device can be used, for example, for general illumination in living spaces, motor vehicles, airplanes, office buildings or for similar applications. The illumination device may also be used as illumination in photocopiers or scanners.

The invention is not limited to the description based on the embodiments. Rather, it includes any new characteristic and any combination of characteristics, especially any combination of characteristics in the patent claims even if such characteristic or such combination is not explicitly indicated in the patent claims or embodiments.

What is claimed is:

1. An illumination device, comprising:
   a light source comprising an organic light-emitting diode; and
   a control device coupled to the diode, wherein the control device is configured to adjust current delivered to the organic light-emitting diode and the current delivered by the control device is dependent on the electric resistance of the organic light-emitting diode;
   wherein the light source and the control device are arranged on a joint carrier, the control device includes an organic material and the light source and control device are jointly encapsulated.

2. The illumination device of claim 1, wherein the control device is designed to regulate the current so that the organic light-emitting diode emits a constant amount of electromagnetic radiation over time.

3. The illumination device of claim 1, wherein the control device includes an operational amplifier.

4. The illumination device of claim 1, wherein the control device includes at least one resistor.

5. The illumination device of claim 1, wherein the control device includes at least one potentiometer.

6. The illumination device of claim 1, wherein the control device includes at least one electric fuse.

7. The illumination device of claim 1, wherein the control device includes an operational amplifier, the light source is connected to an input of the operational amplifier, and an output of the operational amplifier is connected to an input of the light source.

8. A method of operating the illumination device of claim 1, comprising:
   operating the light source of the device of claim 1 by driving the light source with a first current when the organic light-emitting device has a first resistance; and
   subsequently operating the light source by driving the light source with a second current that is higher than the first current when the light-emitting device has a second resistance that is higher than the first resistance.

9. The method of claim 8, wherein a difference between the first resistance and second resistance determines the difference between the first current and second current.

10. A method of making the illumination device of claim 1, comprising:
    positioning the light source on the joint carrier; and
    electrically connecting the control device to the light source to form the device of claim 1.

11. The method of claim 10, wherein the control device includes an operational amplifier.

12. The method of claim 10, wherein the control device includes at least one resistor.

13. The method of claim 10, wherein the control device includes at least one potentiometer.

14. The method of claim 10, wherein the control device includes at least one electric fuse.

15. The illumination device of claim 1, wherein the light source is a resistive passive component of the control device.

16. The illumination device of claim 15, wherein circuitry of the control device consists of an operational amplifier and two resistors other than the light source.

17. The illumination device of claim 15, wherein the control device includes an operational amplifier and the resistance of the light source controls an output of the operational amplifier, which in turn controls current delivered to the light source.

18. The illumination device of claim 16, wherein a resistor of the resistors is a potentiometer that dimensions a change in current delivered to the light source as the resistance of the light source changes.

* * * * *